May 3, 1932. E. R. M. HOLMQUIST 1,856,075
VEHICLE
Filed May 4, 1929   3 Sheets-Sheet 1
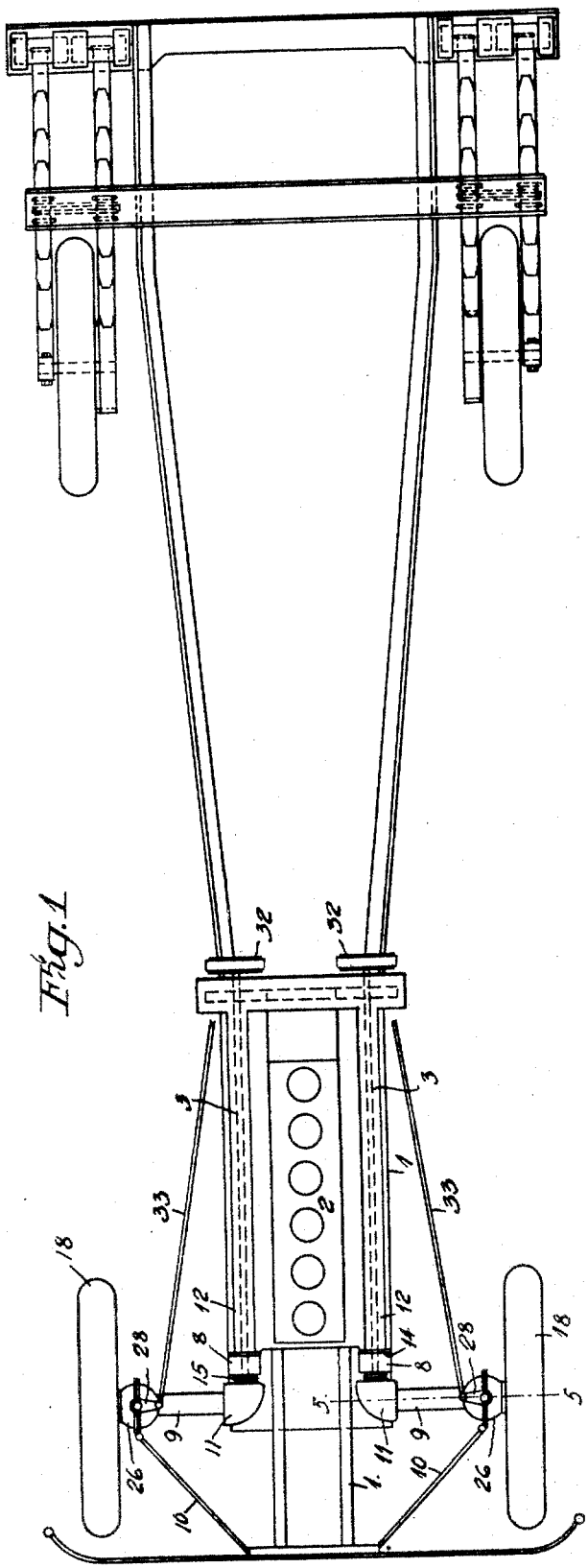
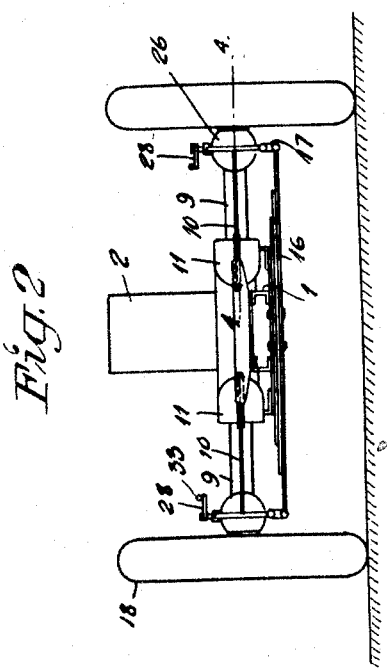
INVENTOR
Ernst Rudolf Magnus Holmquist
by
ATTORNEY

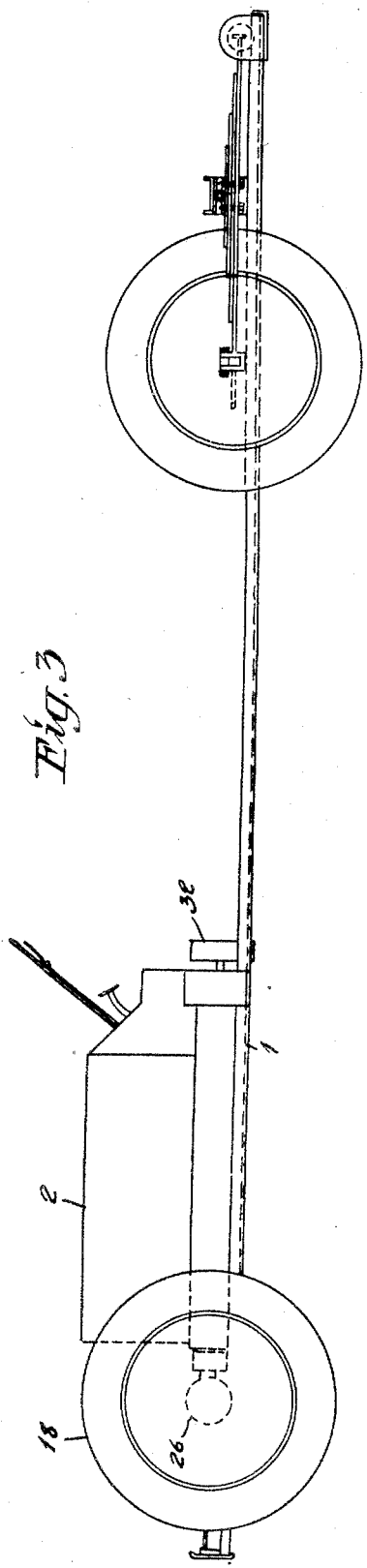

May 3, 1932.  E. R. M. HOLMQUIST  1,856,075
VEHICLE
Filed May 4, 1929   3 Sheets-Sheet 3
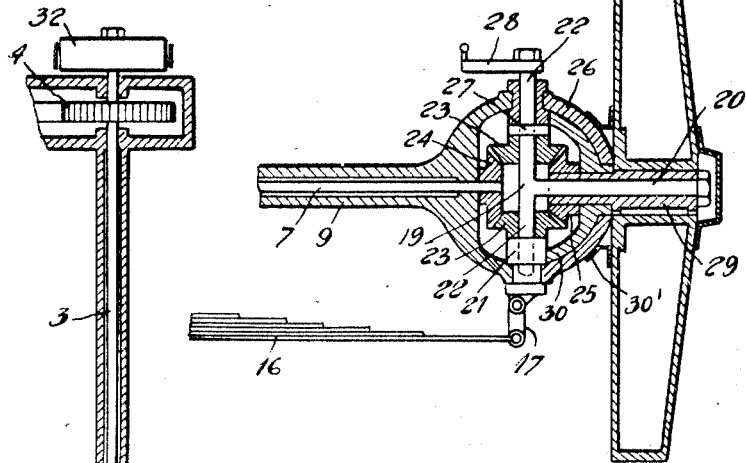
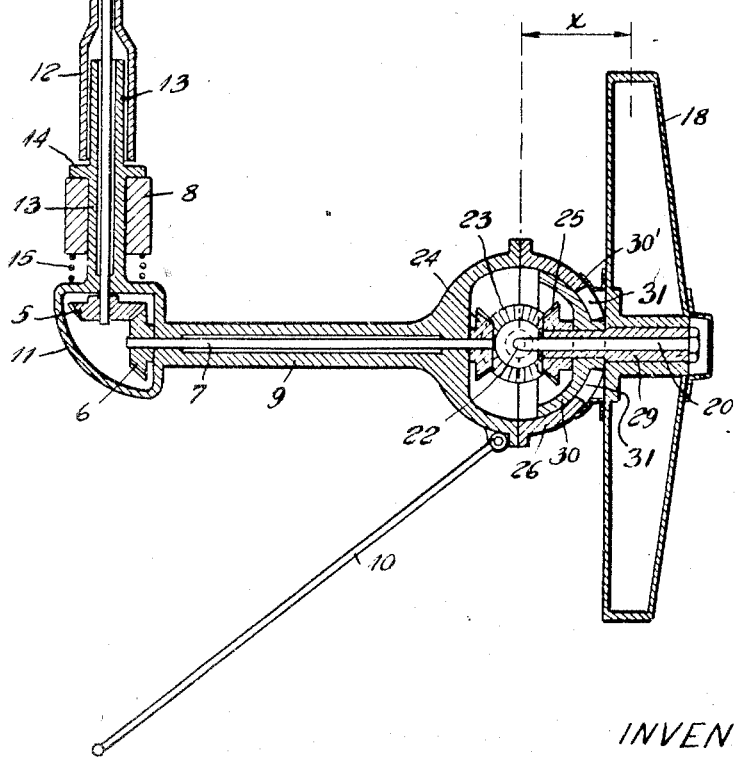
INVENTOR
Ernst Rudolf Magnus Holmquist
by
ATTORNEY Patented May 3, 1932

1,856,075

UNITED STATES PATENT OFFICE

ERNST RUDOLF MAGNUS HOLMQUIST, OF LILLA EDET, SWEDEN

VEHICLE

Application filed May 4, 1929, Serial No. 360,512, and in Sweden March 11, 1929.

The present invention refers to vehicles, especially motor-driven vehicles, such as motor cars and the like, and the invention substantially aims at such an arrangement of the wheels that each wheel may, independently of the others, follow the irregularities of the road individually, so that the vehicle obtains, when in motion, softer and more flexible movements than vehicles of the construction hitherto known.

More particularly, the invention refers to means for transmitting power to the driving wheels from a motor disposed on the vehicle, and to this end one object of the invention is to provide power transmission to such driving wheels which for the purpose of bringing about soft and uniform movements of the vehicle in its propulsion are arranged in the vehicle in such manner that each driving wheel may follow the irregularities of the road individually, independently of the other wheels.

The invention also relates to an arrangement for resilient support of one or more of the wheel axles of the vehicle, and to this end a further object of the invention is to provide a resilient connection between the vehicle and the wheel axles of such a nature that the arrangement of each wheel per se in the chassis of the vehicle is facilitated, due regard being taken to the condition that the arrangement of the wheel axles at the springs must be such as to ensure a support of the wheels which is sufficiently strong to withstand, among other things, lateral strains and the like.

The invention principally consists in that one or two parallel shafts driven by the motor are in connection with shafts coupled to the driving wheels, substantially at right angles to the latter, by means of worm gearings or toothed gearings, each driving wheel being rotatably mounted with its coupling shaft in a special part consisting preferably of a frame or the like, said part being pivotally connected with the vehicle about an axis coinciding substantially with the driving shaft in question.

The arrangement is also applicable for power transmission onto such driving wheels which have their axles swingably arranged in the horizontal plane in order to facilitate steering of the vehicle.

To bring about a resilient connection between the vehicle and one or more of the wheel axles thereof, the connection between each of such wheel axles and the vehicle according to the invention consists of two springs secured to the chassis of the vehicle and extending each on one side of the wheels in question.

Such an arrangement of the wheels brings about the advantage that the vehicle obtains a softer and more flexible motion than such vehicles which are in known manner provided with wheels arranged each at one end of the axle in question, besides which the arrangement involves a considerable simplification from the point of view of construction, such simplification making it possible, particularly in motor-driven vehicles, that the non-driven wheels may be provided with supporting means of the type hereinbefore stated, so that the invention could be advantageously applied to the supporting means for the axles of the rear wheels, for instance, in motor vehicles propelled by the front wheels.

Arrangements should then be made to render the wheels accessible for inspection, dismantling, repair or the like, preferably by the one of the springs provided each on one side of the wheels in question being removably attached to the wheel axle and, besides, arranged to be removed from the wheel in such a manner as to render the latter accessible from the one side, which arrangement may be simply carried into effect, for instance, by having the removable springs secured either in a displaceable or rotary manner to the chassis of the vehicle.

The invention is illustrated on the accompanying drawings. Fig. 1 is a plan view of the underfame or chassis of a motor car with driven front wheels, the rear wheels being supported by resilient means according to the invention. Fig. 2 is a front view and Fig. 3 an elevation thereof. Fig. 4 is a section to an enlarged scale on line 4—4 in Fig. 2, and Fig. 5 is a section on line 5—5 in Fig. 1, likewise on a larger scale.

Provided on the underframe 1 of the vehicle for the propulsion thereof is a motor 2, the crank shaft of which is connected by a gear box with two shafts 3 mounted each on one side of the motor, in the longitudinal direction of the vehicle, said shafts 3 being rotatable by means of toothed wheels 4 or the like secured on the ends thereof. The other end of the shaft is provided with a bevel gear 5, see Fig. 4, engaging another similar toothed wheel 6 arranged to drive a coupling shaft 7 connected to the one front wheel and extending substantially at right angles to the shaft 3, said shaft 7 being rotatably mounted in a part 9 arranged in the vehicle and rotatable or swingable in a bearing 8 about an axis coinciding with the shaft 3, said part 9 being provided with a stay 10 to make provision for means to withstand strains or the like, which stay 10 is secured with its one end to the outer end of the part 9, while being arranged with its other end, by means of a ball and socket joint, in the underframe of the vehicle, at a point situated on the centre line of the shaft 3. The part 9 is formed at the toothed gearing into a casing 11 enclosing the same, and in order to secure rigid mounting in the vehicle, it is formed into a pin 13 guided by the bearing 8 as well as by a second bearing 12 preferably secured on the motor frame. Moreover, the said pin 13 is provided with a flange 14 bearing against the one side of the bearing 8 so as to fix the part 8 in the axial direction, as well as with a spring 15 arranged between the opposite side of the bearing and the casing 11. The resilient connection between the wheels and the vehicle is obtained by the spring 16, see Fig. 2, transversely arranged underneath the parts 9, said spring 16 being secured at its center to the underframe 1 of the vehicle and with its ends to the outer ends of the parts 9 by means of links 17. By means of the springs 16, the stays 10 and the mounting arrangements 8 and 12 of the part 9 pivotally connected with the vehicle, a reliable and resilient connection is obtained between the wheels and the chassis of the vehicle, said connection being capable of withstanding strains, which is of great importance whether the coupling shaft 7 be directly connected to the driving wheel 18 or whether the shaft carrying the wheel 18 be swingably arranged in the horizontal plane to facilitate steering of the vehicle by means of the wheels.

This latter arrangement consists of a cross piece 19, see Fig. 5, preferably T-shaped and pivotally mounted in the horizontal plane at the outer end of the part 9, the web portion of said cross piece being for this purpose formed into a stud 20, on which the driving wheel 18 is rotatably arranged, while the two remaining portions are formed into studs 22 mounted in bushings 21 secured in the frame part 9. The free end of the coupling shaft 7 is connected to the driving wheel 18 by means of bevel gears, two equal-sized gears 23 both of which are rotatably mounted about the studs 22 of the cross piece and adapted to engage a toothed wheel 24 secured on the free end of the coupling shaft 7, and also to engage a toothed wheel 25 connected with the driving wheel. The cross piece and the gearings are enclosed by a casing formed in the frame part 9, said casing being preferably of a hemispherical main shape and covered by a cover 26 of the same shape, the casing and its cover being moreover arranged together to form an attachment for the bushings 21 carrying the cross piece 19, said bushings being also arranged to guide the cross piece in the vertical direction, for instance by means of a flange 27 arranged on the cross piece. The one stud 22 of the cross piece is made longer than the other so as to reach outside the one bushing, preferably the upper one, where it forms an attachment for an arm 28 which may in known manner be connected with the steering gear of the vehicle. With respect to the mounting, the driving wheel 18 is connected with the bevel gear 25 by means of a bushing 29 rotatably arranged on the stud of the cross piece, said bushing having also secured thereto a dished member 30 bearing on the inside against the cover 26, which member 30 is adapted to bring about tightening of an opening 31, see Fig. 4, provided in the cover 26 to facilitate swinging of the cross piece, whereby the gearings arranged within the casing may be kept enclosed against the access of dust and oil. The dished tightening member 30 may either be so arranged as to take part in the rotation, as shown in the drawings, or may be so arranged that the bushing 29 moves freely therein. Moreover, a protecting plate 30′, preferably dish-shaped, may be secured to the wheel 18, said plate bearing without any appreciable friction against the outside of the cover 26, forming a tight fit therewith. The braking means for each wheel is preferably arranged at the driving shaft 3 by means of a disk 32 secured on the one end of a shaft, said disk being adapted to be actuated by braking devices of any suitable, previously known construction.

The connection between the steering device provided on the vehicle and the arms 28 secured on the one stud end of the cross piece 19 comprises link rods 33 or the like and is, moreover, so arranged that in steering the wheels 18 adjust themselves relatively to each other in the manner desired. In this operation, the cross piece with the gear wheels 25 and the guiding wheel 18 mounted on the web portion 20 thereof will thus turn about the studs 22 of the cross piece and about the gear wheels 23 arranged concentrically therewith, so that the tooth engagement between the gear wheels 23 and 25 is retained independently of the position which the driving wheel is caused to assume.

As the turning moment produced in driving and braking the wheels 18 will be counteracted by a moment exerted by the link rods 33, it is of importance that this moment be made as small as possible. According to the prevalent conditions, the distance between the cross piece studs 22 and the center of the wheel path, designated by X in the drawings, may be given a suitable value, if the wheel 18 is shaped in accordance therewith. For instance, the value of X may be selected so as to approach zero, in which case the power required for the steering of the vehicle is believed to have its minimum value.

The embodiment described may be varied and completed in many respects in regard to most of the detail arrangements. Thus, for instance, all shafts have been fitted with friction bearings, according to the drawings, but it is evident that the mounting of the shafts on balls or rollers is much to be preferred from the point of view of friction. Moreover, the toothed gearings all over have been shown as provided with a ratio of 1:1, while it is possible also to use other ratios both in the transmission between the shafts 3 and 7, and between the shafts 7 and the driving wheel, in which latter case, however, the toothed wheels 23 should be provided with doubled tooth rims, besides which the arrangement of two toothed wheels 23 moving freely on the studs 22 of the cross piece may, although preferable from the point of view of operation, be replaced by a single toothed wheel 23 involving the same effect. Tightening of the opening 31 provided in the cover of the casing may also be brought about by arranging the tightening member 30 carried by the wheel axle 20 to enclose the outside of the casing arranged at the end of the frame part 9 while bearing thereagainst with a tight fit.

The invention is applicable not only in front wheel driven vehicles, but also to drive the rear wheels of the vehicle and, besides, in such cases where all wheels of the vehicle are to be driven; two, four or all wheel axles may then be swingably arranged in the horizontal plane to bring about steering of the vehicle in the same way as shown at the front wheels.

What I claim is:—

1. In a motor driven vehicle, an arrangement for transmitting power from the motor to the driving wheels, including the combination, with a pair of substantially parallel drive shafts driven by the motor and disposed in the longitudinal direction of the vehicle and a transversely directed shaft arranged for each driving wheel, of a bearing member provided for each of said transversely directed shafts and pivoted upon said vehicle so as to be individually swingable upon respective axes coinciding with the axes of said parallel drive shafts, there being means including gearing respectively interposed between each of said transversely directed shafts and the corresponding drive shafts for individually driving said first shafts.

2. In a motor driven vehicle, an arrangement for transmitting power from the motor to the driving wheels, including the combination, with a pair of spaced similar drive shafts driven by the motor and disposed generally in the longitudinal direction of the vehicle and a transversely directed shaft arranged for each driving wheel, of a bearing member provided for each of said transversely directed shafts and individually pivoted so as to be swingable upon respective axes coinciding with the axes of said parallel drive shafts, there being means including gearing respectively interposed between each of said transversely directed shafts and the corresponding drive shafts for individually driving said first shafts.

3. In a motor driven vehicle, an arrangement for transmitting power from the motor to the driving wheels, including the combination, with a pair of spaced similar drive shafts driven by the motor and disposed generally in the longitudinal direction of the vehicle and a transversely directed shaft arranged for each driving wheel, of a bearing member provided for each of said transversely directed shafts and individually pivoted so as to be swingable upon respective axes coinciding with the axes of said spaced drive shafts, a pair of cross pieces individually pivoted to the outer end of each of said bearing members so as to swivel about a vertical axis thereon and steering means upon said vehicle connected to said cross pieces for the purpose of turning the same and the respective driving wheels associated therewith at will, there being means including gearing respectively interposed between each of said transversely directed shafts and the corresponding drive shafts for individually driving said first shafts, there being also gearing interposed between each of said transversely directed shafts and the respective drive wheel to drive the latter, which latter gearing includes among a plurality of gears an intermediate gear associated with each cross piece and pivoted to rotate upon a vertical axis coinciding with the axis of said cross piece.

4. In a motor driven vehicle, an arrangement for transmitting power from the motor to the driving wheels, including the combination, with a pair of substantially parallel drive shafts driven by the motor and disposed in the longitudinal direction of the vehicle and a transversely directed shaft arranged for each driving wheel, of a bearing member provided for each of said transversely directed shafts and pivoted upon said vehicle so as to be individually swingable upon respective axes coinciding with the axes of said parallel drive shafts, there being means including gearing respectively interposed between each of said transversely directed shafts and the corresponding drive shafts for individually driving said first shafts, a pair of cross pieces individually pivoted to the outer end of each of said bearing members so as to swivel about a vertical axis thereon, and steering means upon said vehicle connected to said cross pieces for the purpose of turning the same and the respective driving wheels associated therewith at will, there being also gearing interposed between each of said transversely directed shafts and the respective drive wheel to drive the latter, which latter gearing includes among a plurality of gears an intermediate gear associated with each cross piece and pivoted to rotate upon a vertical axis coinciding with the axis of said cross piece.

In testimony whereof I affix my signature.

ERNST RUDOLF MAGNUS HOLMQUIST.